Nov. 13, 1951  R. C. PERSONS  2,575,292
CRASH GUARD FOR BICYCLES AND THE LIKE
Filed March 27, 1948  2 SHEETS—SHEET 1

INVENTOR.
Robert C. Persons
BY
Charles R. Fay,
atty.

Nov. 13, 1951   R. C. PERSONS   2,575,292
CRASH GUARD FOR BICYCLES AND THE LIKE
Filed March 27, 1948   2 SHEETS—SHEET 2

INVENTOR.
Robert C. Persons
BY

Patented Nov. 13, 1951

2,575,292

UNITED STATES PATENT OFFICE 2,575,292

CRASH GUARD FOR BICYCLES
AND THE LIKE

Robert C. Persons, Worcester, Mass., assignor to
Persons-Majestic Mfg. Co., Worcester, Mass., a
corporation of Massachusetts Application March 27, 1948, Serial No. 17,465

1 Claim. (Cl. 280—289)

This invention relates to improvements in crash guards for bicycles and similar two-wheeled vehicles for the purpose of providing increased protection for the rear wheel, the rear wheel mud guard and related portions of the frame of the cycle; to provide increased protection to the rider in the event of the vehicle tipping, sliding or falling over.

It is my object to provide such a guard readily attached to the rear portion of the bicycle, or similar two-wheeled vehicle, which guard will be interchangeable between the several commercial makes and models of these vehicles, necessitating no changes in the design of the vehicles.

A further object is to provide such an attachment having a high degree of ease of manufacture, and one which can readily be assembled to a bicycle by an unskilled person, through the use of tools normally used in the maintenance of a bicycle.

This invention will be clearly understood from the following description.

Reference is to be had to the accompanying drawings in which

Figure 1:
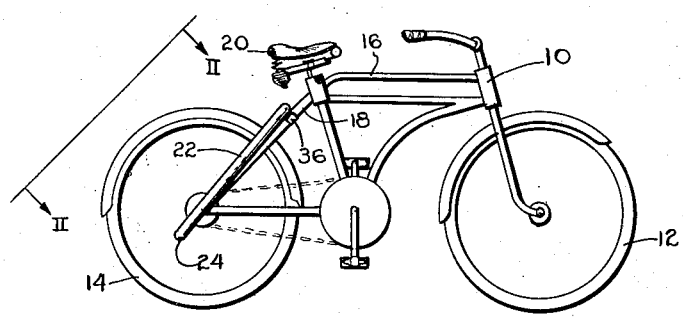
Fig. 1 is a view in side elevation of a bicycle incorporating my invention.

A bicycle 10 is shown for purposes of illustration and, as is customary, is provided with front and rear wheels 12 and 14, frame 16, rear fork 18, and saddle seat 20. The new crash guard is shown at 22 and as clearly seen in Fig. 1, this guard extends below the hub of the rear wheel and up the rear fork to a point just under the saddle 20. In this position and with the present novel construction, the crash guard is out of the way so that it fails to interfere in any way with the operation of the vehicle, but still carries out its purposes and functions. Also, it will be clear from Fig. 2 how the guards 22 protect the rider, particularly his legs, and also the machine itself, the guards being attached one at each side of the rear wheel.

The guards are tubular and have sufficient diameter and wall thickness to provide the strength necessary. The guards are identical and each one is bent at one end into a J-shape, see 24, the free end of which is flattened as at 26 and punched to form a fastener hole. The other end of each guard 22 is bent at a right angle to the main body thereof and in the plane of the J end, see 26, these ends also being flattened and punched as at 28.

Figure 2:
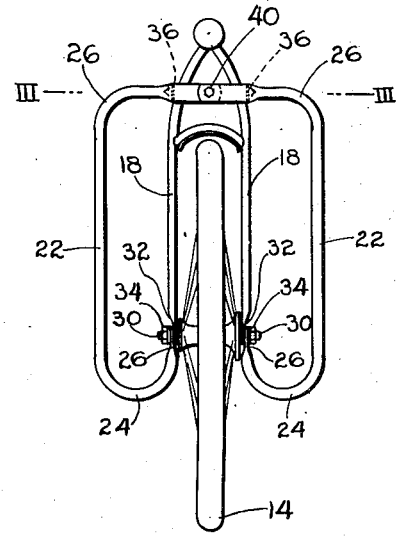
Fig. 2 is a view looking in the direction of the arrows II—II on Fig. 1, showing the method of attaching the crash guard to the rear wheel hub and rear frame fork.

The hole in the flattened J end 26 receives the axle 30 of the rear wheel, as shown in Fig. 2, next to the ends of the rear fork 32, and secured by a washer and nut assembly 34, already present and supplied to hold the rear fork to the wheel hub. Thus no parts are required to attach the lower J ends of the guards to the cycle.

Figure 3:
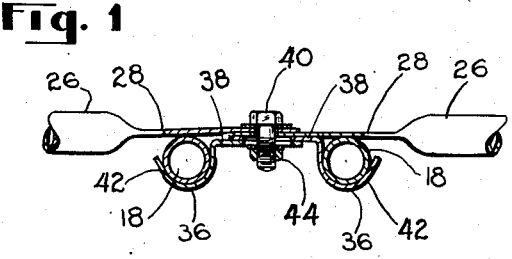
Fig. 3 is a sectional view taken on line III—III of Fig. 2, and which shows the method of attaching the guard to the rear fork of the cycle.

However, to attach the upper ends 26 of the guards to the cycle, use is made of a special clip 36 made in two identical parts, see Fig. 3. Each clip has a straight flat portion 38 correspondingly slotted to overlap and receive a bolt or other fastener 40, and a depending rounded hook portion 42 receiving the two parts of the rear wheel fork 18. A nut 44 tightens the fork parts 18 to the guard flattened parts 28, which are superposed, and holds the guards rigidly as shown. Due to the slots in the clips, the latter are adjustable to accommodate any bicycle or similar vehicle on the market having a fork extending substantially to the saddle.

Figure 4:
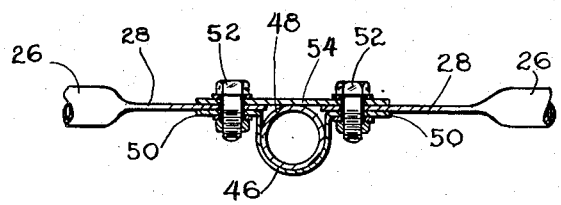
Fig. 4 is a view similar to Fig. 3 which shows a method of attaching the crash guard when the rear fork is below the attachment point thereto.

In cases where the rear fork does not continue far enough toward the saddle to use the clips above described, there is provided an alternative clip 46 having a U-shaped center portion receiving the single member 48 found in such vehicles. This clip has two equal and oppositely extending flat terminal portions 50 which are slotted to receive bolts 52 extending through an auxiliary plate 54 and through the flat ends 28 of the guards 22 separately as clearly shown in Fig. 4. Nuts 56 tighten the fork 48 to the auxiliary plate, the guard ends 28 being interposed between the ends 50 of the clip 46 and the plate 54.

Figure 5:
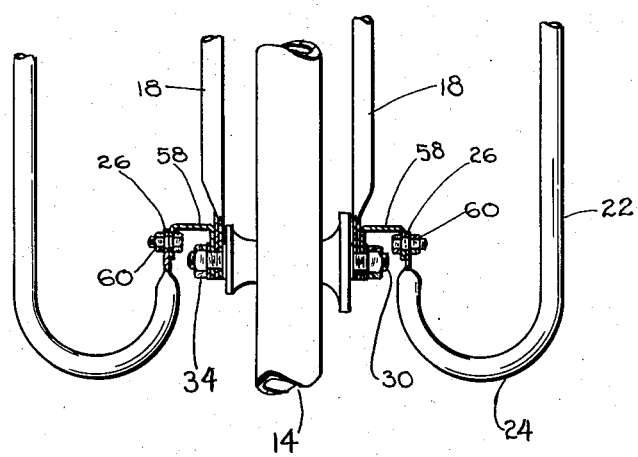
Fig. 5 is a view similar to Fig. 2, parts being broken away, and showing an alternative method of attaching the crush guard to the hub of the rear wheel.

Some cycles are provided with a rear stand that is attached to the rear axle or hub, and this will interfere with the system for attaching the guards in the manner of Fig. 2. To eliminate this, an alternative method of attaching the J ends of the guards is illustrated in Fig. 5, wherein an inverted U-shaped bracket 58 having a long and a short apertured arm is arranged on the hub 30 and spaces the guards from the fork to allow for the stand mentioned above. The short legs are sufficient to attach the guard by a nut and bolt 60, and the long legs are attached to the axle by nut 34 as before.

Figure 6:
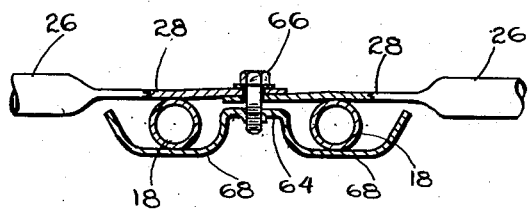
Fig. 6 is a view similar to Fig. 3 and showing a modification.
Figure 7:
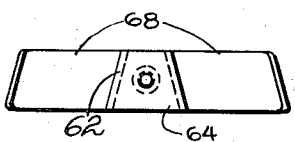
Fig. 7 is a plan view of the clamp of Fig. 6.

A one piece clip for forked cycles, which may be used in place of the two piece clip of Fig. 3, is shown in Figs. 6 and 7. This comprises a tapered part 62, see Fig. 7, to fit the taper of the fork, and has a raised center portion 64 tapered to receive a bolt 66 extending through the overlapped ends 28 of the guards. At each side of the center portion 64 there is an elongated pocket 68 to receive various sizes or spacings of forks. The bolt of course tightens the fork to the guard portions 28.

It will be seen that this invention provides a new and improved crash guard construction of simple and uncomplicated nature, and having attaching means for the vehicle to suit all possible conditions.

Having thus described my invention and the advantages thereof, I do not wish to be limited to the details herein disclosed otherwise than as set forth in the claim, but what I claim is:

For use with cycles of varying makes which include a frame, a saddle seat projecting upwardly from the rear end of the frame, a rear fork extending downwardly at the rear of the frame, a rear axle hub carried by the lower end of the fork, and a rear wheel carried by the hub, the improvement comprising a detachable and adjustable crash guard including a pair of separate elongated substantially J-shaped guard members having means at the curved J ends for attachment to opposite ends of the hub of the cycle, and having inwardly turned portions at their opposite ends for attachment to the fork at a position intermediate the top of the wheel and the saddle seat, and adjustable means for fastening said inwardly turned portions to the fork comprising a clip bulged to embrace the fork, and threaded fastening means projecting through the ends of said arms and through said clip for securing the parts in adjusted position, said clip being of one-piece integral construction and including a pair of outwardly bulged side wings forming pockets adapted to overlap a pair of fork parts, and an intermediate portion bowed in the opposite direction from the pockets and perforated and threaded for engagement by the threaded fastening means, the pockets being of substantially greater width than the diameters of the fork parts, and the walls of the pockets being inclined to permit attachment to forks of varying lengths.

ROBERT C. PERSONS.

REFERENCES CITED

The following references are of record in the file of this patent:

UNITED STATES PATENTS

| Number | Name | Date |
| --- | --- | --- |
| 600,364 | Hill | Mar. 8, 1898 |
| 620,651 | Heineke | Mar. 7, 1899 |
| 1,307,240 | Christopher | June 17, 1919 |
| 2,126,752 | Devine et al. | Aug. 16, 1938 |
| 2,229,756 | McCann et al. | Jan. 28, 1941 |

FOREIGN PATENTS

| Number | Country | Date |
| --- | --- | --- |
| 346,757 | Great Britain | Apr. 16, 1931 |
| 504,906 | Great Britain | May 2, 1939 |